May 9, 1939.  R. R. BLOSS  2,157,728
SPEED-UP AND SPEED-DOWN FOR ROTARIES
Filed Nov. 22, 1937  5 Sheets-Sheet 3

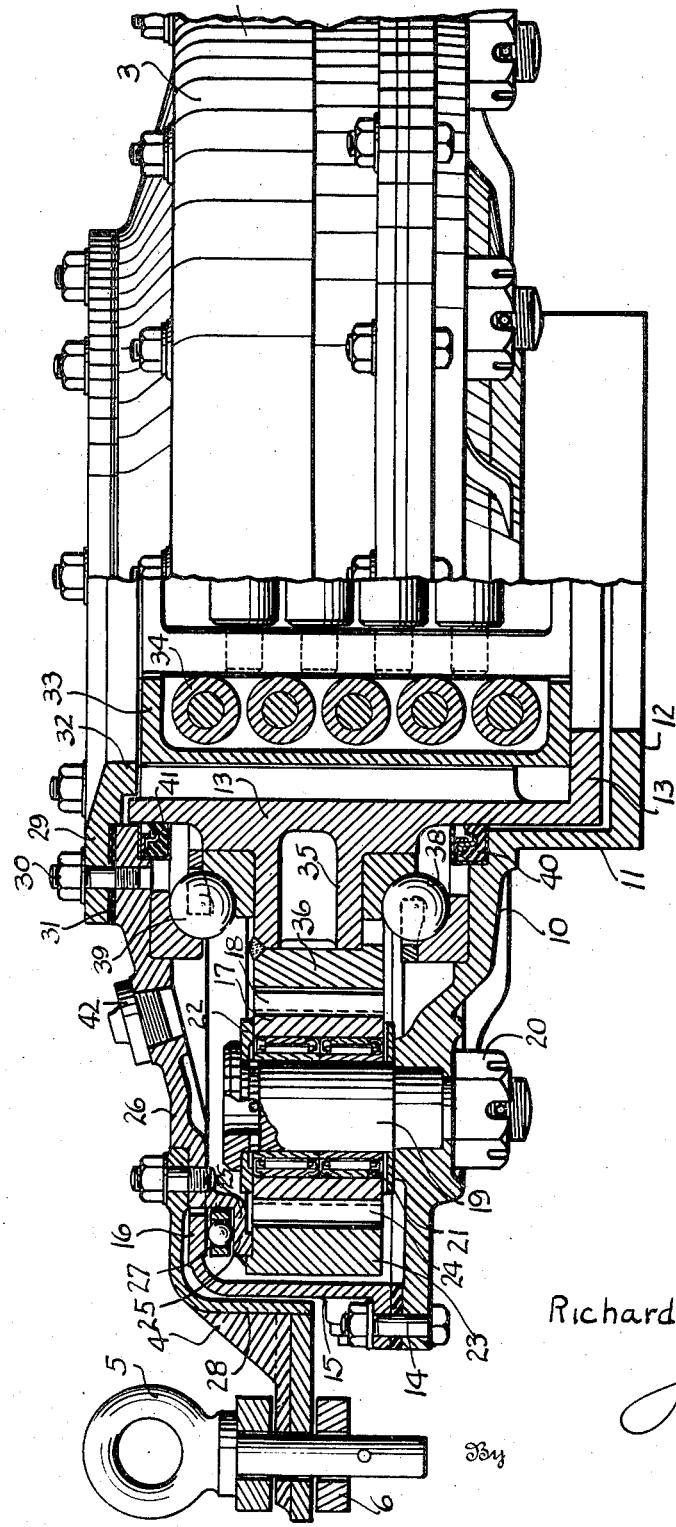

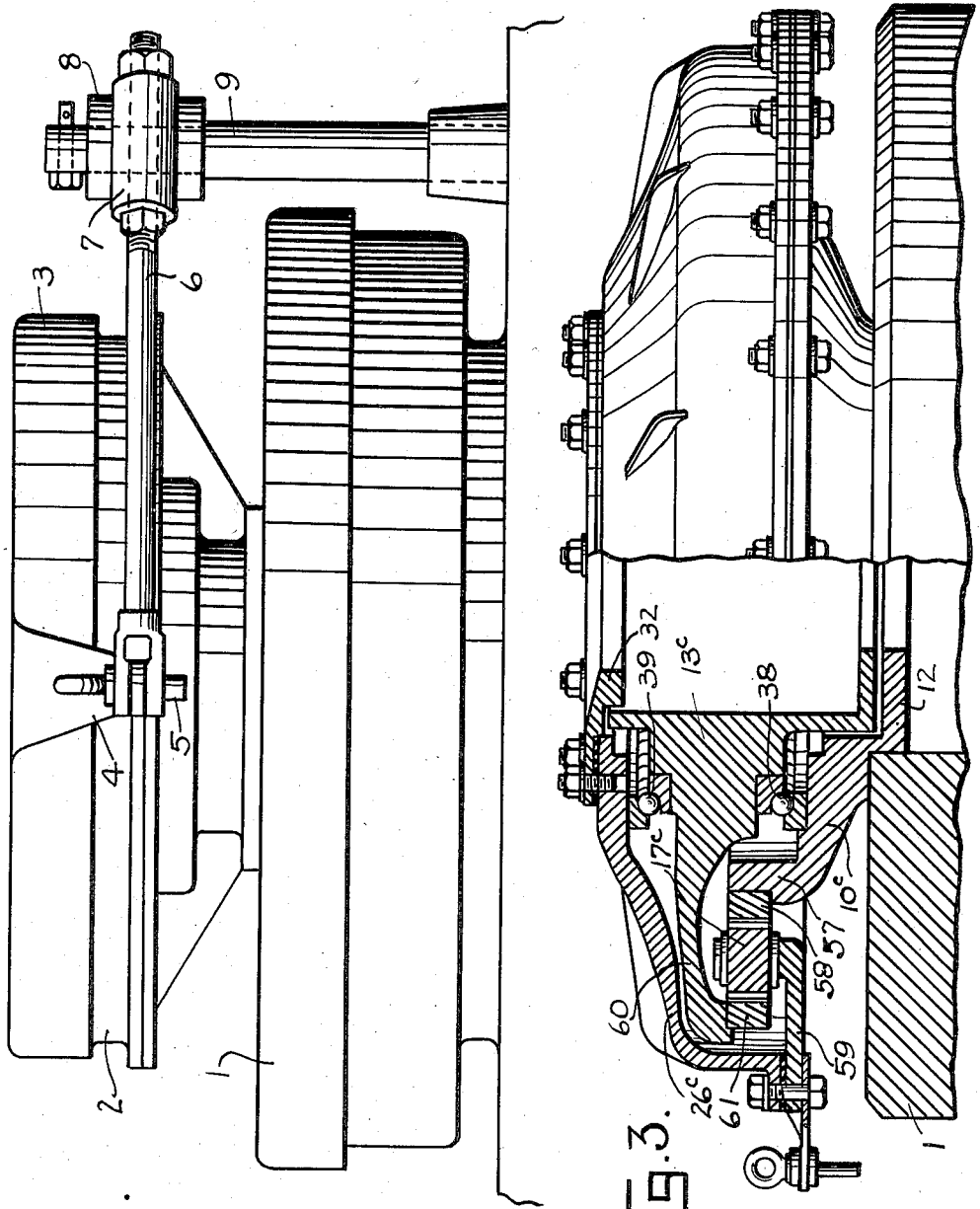

Richard R. Bloss  Inventor

By Jesse R. Stone
Lester B. Clark

Attorneys

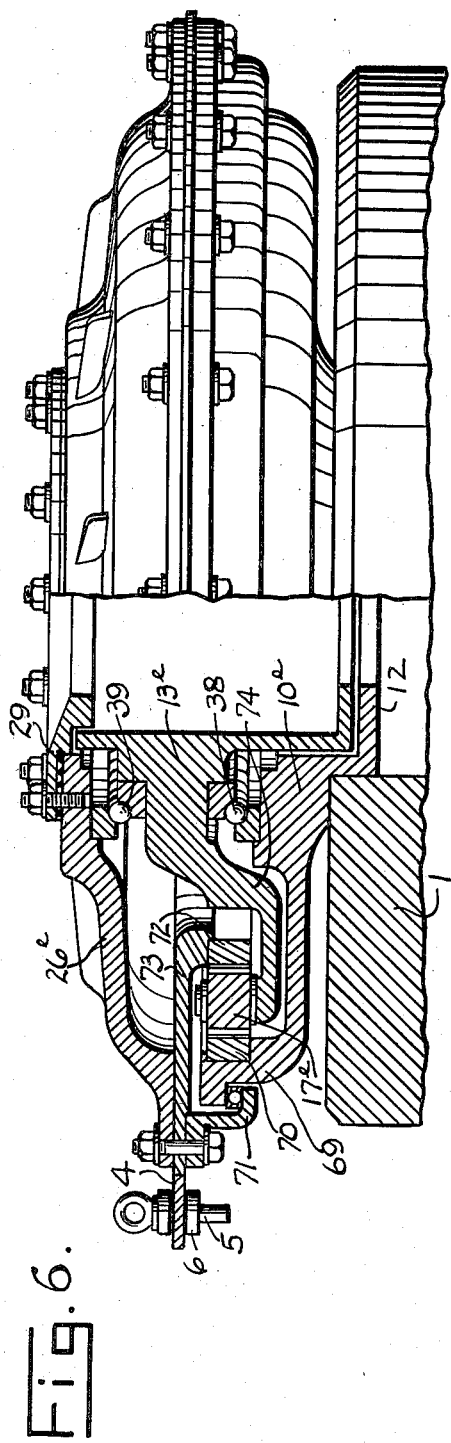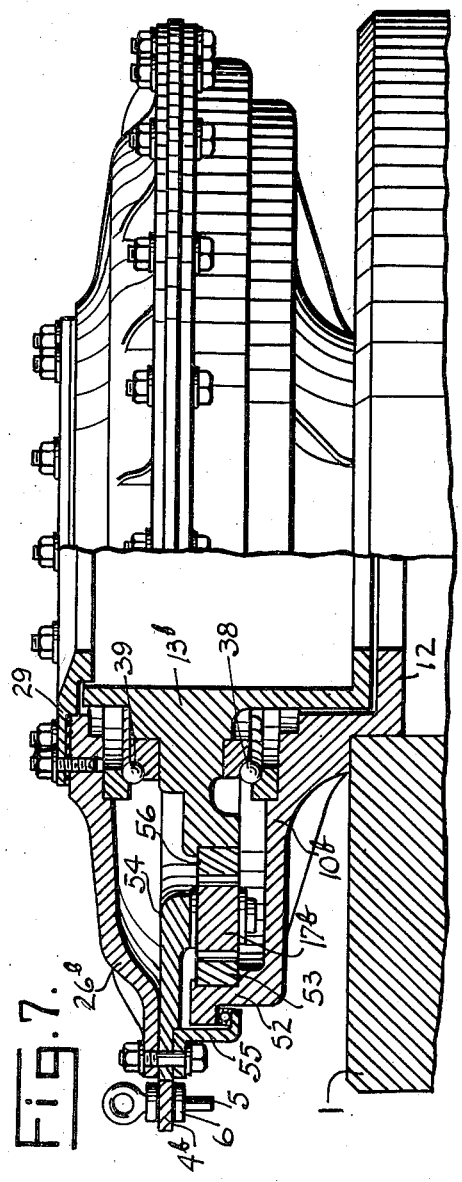

May 9, 1939.　　　　R. R. BLOSS　　　　2,157,728
SPEED-UP AND SPEED-DOWN FOR ROTARIES
Filed Nov. 22, 1937　　　5 Sheets-Sheet 5

Inventor
Richard R. Bloss
Jesse R. Stone
Lester B. Clark
Attorneys

Patented May 9, 1939

2,157,728

UNITED STATES PATENT OFFICE 2,157,728

SPEED-UP AND SPEED-DOWN FOR ROTARIES

Richard R. Bloss, Beaumont, Tex., assignor to International Derrick & Equipment Company, a corporation Application November 22, 1937, Serial No. 175,903

8 Claims. (Cl. 255—23)

My invention relates to rotaries employed particularly in the oil fields for communicating a rotating motion to the drill and the drill stem employed in drilling.

The oil field rotary ordinarily includes a rotating table having a central opening through which the drill stem may project with means on the table to grip the drill stem so as to rotate the same. There is a driving pinion engaging with a gear ring on the outer margin of the table through which the table is caused to rotate. In rotating a rotary table at high speeds, such as are desirable in the drilling of wells particularly where a straight hole is to be obtained, it is difficult to operate the table at such speeds without excessive vibration and heating up of the operating parts.

It is further desirable at times to operate the table at a comparatively low speed. This is the case where the power employed in rotating the drive shaft is a Diesel or internal combustion engine where it is not desired to throttle down the high speed of the engine. Further, even with ordinary prime movers which are now employed it is desirable in some instances to move the rotary at a very slow speed where the rotary is employed, for example, in screwing up tool joints and the like.

It is one of the objects of the invention, therefore, to provide a speed change between the rotary and the drill stem whereby the speed of rotation of the drill stem may be varied to slow down or speed up the rotation of the drill stem relative to the rotary.

The invention is an improvement upon the rotary disclosed in the patent to Boykin, No. 2,044,203, issued June 16, 1936.

In the device disclosed in the patent above identified provision is made only for speeding up the rotation of the drill stem and in so doing the structure shown is subject to material improvement in order to adapt it more practically to the actual drilling of wells. It is, therefore, an object of this invention to improve upon the structure of the Boykin patent and to further construct the device so that a slowing down in the speed of rotation of the drill stem relative to the speed of the rotary may be obtained.

The invention resides largely in the particular structure and arrangement of the parts which are better understood by reference to the drawings herewith.

In the drawings Fig. 1 is a side view partly in central vertical section showing the speed change mechanism adapted to be fixed within the rotary table.

Fig. 2 is a side elevation of the speed changing mechanism shown as positioned upon the rotary, said view being taken at right angles to the view shown in Fig. 1.

Fig. 3 is a side view similar to Fig. 1 and illustrating a different embodiment of the speed changing mechanism.

Figs. 4, 5, 6 and 7 are each side views partly in vertical section and illustrating different embodiments of the inventive idea which may be employed for the purpose stated.

Figure 4:
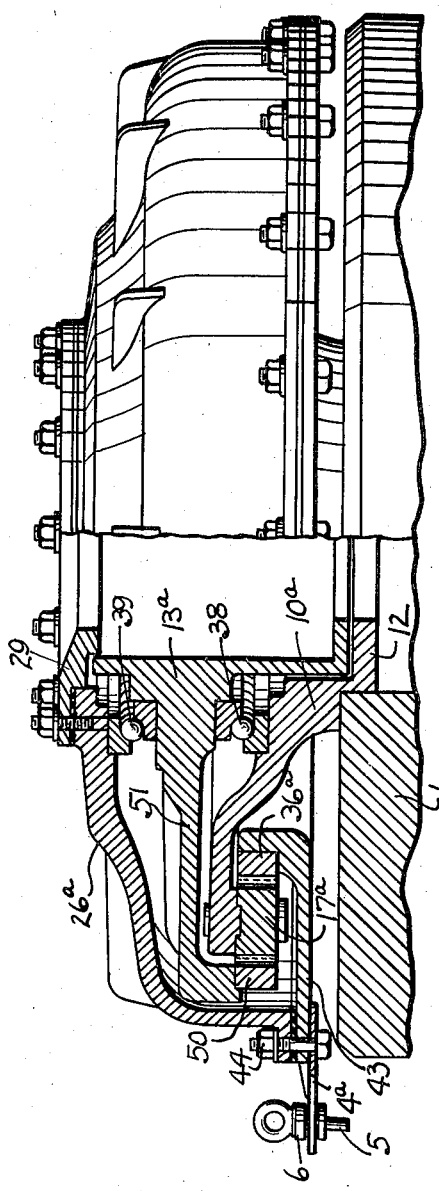

It will be understood with reference to Fig. 2 that my device is intended to be employed with a rotary table 1 having means, not shown, for communicating rotative movement to said table. Positioned centrally within the opening in the table is my drill stem driving mechanism. This mechanism is enclosed within a housing which may be designated generally at 2 and is made up of parts which will be later described. The upper annular cap plate 3 forming a part of the housing is held against rotation through means of a laterally extending arm 4 thereon, said arm having an opening therein to receive a pin 5. A bifurcated rod 6 fits over the arm 4 and is adapted to receive the pin 5 to secure said rod to the arm. The opposite end of the rod 6 is held within a sleeve 7 formed upon the side of a vertical bushing 8 mounted upon the upstanding post 9 supported rigidly within the base of the rotary.

Referring particularly to Fig. 1, it will be seen that the housing indicates a lower drive plate 10 and it may be understood that the neck of this drive plate is polygonal in cross section to fit within a polygonal opening in the rotary table so that as the table is rotated a rotative movement will be communicated to the plate 10. For this purpose said plate has a downwardly extending portion 11 reduced in diameter and forming a neck to fit within a rotary table and I have shown an inwardly extending flange 12 thereon above which may be supported the drive bushing 13. The drive plate is extended laterally and has its outer margin formed with openings therein to receive bolts 14 through which the said drive plate is secured to an upwardly extending rim 15 which forms a substantial portion of the housing.

The upper margin of the rim 15 is turned inwardly and formed with a horizontal ring 16 which may be termed a "hold-down" ring for the reason that it fits above a portion of the stationary housing and acts to prevent downward movement of the drive plate relative to the housing.

Formed upon the drive plate at a plurality of points around the same are drive pinions 17 having radially projecting gear teeth 18 thereon, said drive pinions being rotatable upon supporting posts or shafts 19. Said shafts are formed with a downwardly projecting end which extends through the drive plate and is threaded to receive a nut 20 through which the post may be held removably in rigid position. There are anti-friction bearings 21 upon the post to facilitate the rotation of the gear 17 thereon. The upper end of the post has a flaring lateral head thereon to engage above the gear 17 and a washer 22 thereon to hold the gear in position on the shaft. It will be understood that these shafts or posts will have a planetary movement through the rotation of the drive plate.

The drive pinions 17 engage on their outer sides with a stationary gear ring 23 having inwardly projecting teeth thereon. Said stationary gear is held in place by being welded to a plate 25 which is secured to and forms a part of the upper protecting plate 26, which forms a part of the housing. Between the supporting plate 25 and the ring 16 upon the rim 15 is an anti-friction bearing 27.

The upper plate 26 forming a portion of the housing is a stationary plate and is held from rotation by a laterally extending arm 4 connected with the anchor rod 6 which was previously described. The outer margin of the plate 26 is extended downwardly to form a skirt 28 which telescopes over the upstanding ring 15 to effectively house the gears therein and prevent access of mud and grit to the bearings thereof. The inner margin of the plate 26 is formed with an annular opening therethrough to receive the drive bushing.

Around the inner margin of the plate 26 is secured a protecting ring 29, said ring having openings in its outer margin to receive clamping bolts 30 through which the protecting ring is secured rigidly to the inner margin of the plate 26 and packing gaskets 31 between these two surfaces to insure a fluid tight seal. The inner portion of the protecting ring 29 is beveled downwardly and inwardly and is formed with a short downwardly extending flange 32 to engage within the drive bushing 13.

The drive bushing 13 is formed on its inner face to receive an adapter 33 to clamp about the drive stem or kelly, not shown. The particular structure of the adapter 33 need not be particularly considered as it forms no part of the present invention. Within this bushing which has a central squared opening are plates having rollers 34 thereon to bear against the drive stem but to allow downward movement of the drill stem therethrough.

The drive bushing has laterally extending flanges 35 thereon which are welded to a gear ring 36. Said ring has radial teeth thereon engaging with the teeth 18 through which driving rotation is communicated to the drive bushing in an obvious manner. I have provided anti-friction bearings 38 between the lower side of the flange 35 and the plate 10. This anti-friction bearing takes the downward thrust of the weight upon the drive bushing.

Above the flange 35 is an anti-friction bearing 39, which is supported upon the drive bushing and bears against the upper plate 26 and serves to take the upward thrust which may be exerted against the drive bushing in handling the drill stem.

I contemplate running the bearings and the gears in oil and to assure a closed chamber about these parts I employ seal rings 40 and 41 at the upper and lower ends of the drive bushing to seal off against the escape of lubricant and also to provide against the entrance of water and mud from the outside thereon. Lubricant may be poured within the inner chamber of the housing through an upper opening closed by the plug 42.

In the operation of this device the rotary will communicate rotative movement to the drive plate 11, which will cause the movement of the drive pinion in a circular path about the drive bushing. As the gear meshes with the stationary gear 23 it will be rotated rapidly in its path around the interior of the housing and will thus cause the rotation of the gear 36 and the drive bushing at a high speed, thus speeding up the rotation of the drill stem. The operation of this device will be materially different from that of the Boykin device to which reference has been made. The arrangement of the parts, however, are such as to cause the device to function in a more efficient and substantial manner.

In Figs. 4 and 7, I have shown other embodiments whereby an increased speed may be communicated to the drill stem relative to the rotary table. With reference to the Fig. 4 embodiment it will be seen that the drive plate 10a is formed to fit within the rotary table as in the embodiment just described. However, the drive pinion 17a is formed on a post which extends downwardly from the outer edge of the plate. In this form the stationary gear 36a is secured upon the upstanding rim of a stationary plate 43, which is annular in shape and has its outer margin secured by bolts 44 to the upper plate 26a of the housing. There is a laterally extending arm 4a which is anchored by means of the rod 6 in the usual manner.

The drive pinion meshes on its outer side with a ring gear 50, which is secured to the outer downwardly extending rim of the flange 51 formed on the drive bushing 13a. The remainder of the structure is similar to that previously described. In this device it will be seen that the rotation of the plate 10a by the rotary will cause the movement of the drive pinion 17a in an annular track as before. The drive from the pinion to the drive bushing, however, is communicated at the outer side of the drive pinion and a different rotative speed will thereby be obtained. It will be obvious that this structure may be employed as a substitute for that shown in Fig. 1.

In the Fig. 7 embodiment, the arrangement is still different from that previously described. The drive plate 10b is formed on its outer margin with an upstanding rim 52, which has secured on the inner side thereof a driving ring gear 53. This gear meshes with the drive pinion 17b.

Said drive pinion 17b is secured on the inner margin of an annular plate 54, the outer edge of which is secured between the upper housing plate 26b and a supporting ring 55. The plates 26b and 54 are held against rotation by the arm 4b in the manner previously described. The drive bushing 13b has a laterally extending flange thereon to which is secured the ring gear 56 which meshes with the drive pinion and is caused to rotate through the action of said pinion. It will be seen that in this device the rotation of the drive plate 10b will move the ring gear 53, thus causing rotation of the drive pinion 17b and acting to cause the rotation of the ring gear 56 and the drive bushing thereon.

In the operation of this device the action of the parts will be readily understood. The inner ring gear 56 will be rotated at a speed greater than that of the drive plate 10b and the gear 53 thereon, thus causing a speed up in the rate of rotation of the drill stem.

Figure 5:
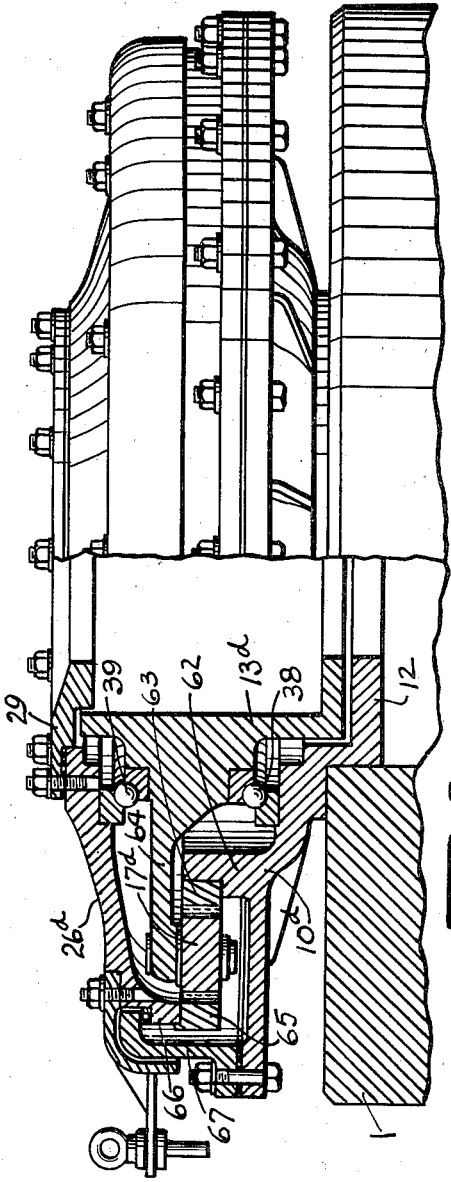

In Figs. 3, 5 and 6 I have arranged the parts in such manner that the speed of rotation of the drive bushing may be slower than that of the rotary. In the embodiment of Fig. 3 there is a drive plate 10c as in the previous embodiment. This drive plate has an upwardly extending rim 57 thereon to which is rigidly secured a radial ring gear 58. The drive pinion 17c is mounted upon a post secured to the inner margin of a stationary plate 59 which is secured at its outer margin to the lower rim of the protecting plate 26c.

The drive bushing 13c has a radially extending flange 60 thereon on the outer margin of which is secured a downwardly extending ring gear 61. With the parts thus arranged it will be seen that as the drive plate 10c is rotated it will move the ring gear 58 and communicate rotation through the pinion 17c with the outer ring gear 61 upon the drive bushing. The effect will be that the drive bushing will be rotated at a speed materially less than that of the rotary. Through the use of a structure such as this the drill stem will be rotated at a comparatively low rate of speed, such as is desired in screwing up tool joints or in rotating the drill stem at a slow rate of speed as may be desired in some forms of drilling or when the drill stem is idling.

In Fig. 5 a similar effect may be produced through the structure there disclosed. In this form the drive plate 10d has at an intermediate point thereon an upstanding flange 62 to which the inner ring gear 63 is secured. The drive pinion 17d in this case is secured on the outer margin of a plate 64 formed upon the drive bushing 13d. The outer ring gear 65 is secured to a downwardly extending flange 66 upon the upper protecting plate 26d.

The outer portion of the housing in this embodiment is formed on an annular plate 67 secured to the outer margin of the drive plate 10a and having its upper margin turned inwardly at 68 to fit above the flange 66 upon the protecting plate. The protecting plate 26d has a marginal ring, the edge of which is curved down to fit outside of the ring 67 and assist in closing the space around the gears.

It will be seen that in this embodiment when the plate 10d is rotated it will serve to rotate the pinion 17d and the engagement of said pinion with the ring gear 65 will cause the travel of the pinion together with the bushing 13d around the interior of the housing at a speed materially lower than that of the rotary table.

In the embodiment shown in Fig. 6, the drive plate 10e is formed at its outer margin with an upwardly extending rim 69, on the inner edge of which is secured the gear ring 70. The outer rim of the drive plate fits above a hold-down ring 71 secured to the outer margin of the plate 26e. The stationary ring 72 in this case is secured upon the inner rim of an annular plate 73, which is anchored at its outer margin to the cap or protector plate 26e. The drive pinion 17e in this case is secured on an upwardly extending post on the outer margin of the flange 74 extending radially outwardly from the guide bushing 13e. As the gear ring 70 is moved to rotate through the movement of the drive plate it will communicate rotation to the drive pinion 17e and as this pinion is in mesh with the stationary ring gear 72 it will cause the said pinion to travel around on said stationary gear at a speed lower than that of the drive plate. The drive bushing 13e will thus travel at a speed lower than that of the rotary table.

By means of the modifications of the original structure I accomplish the rotation of the drive bushing and the drill stem at various speeds relative to the rotation of the rotary table. It will be possible to speed up the rotation of the bushing relative to the table or to speed down the rotation of the bushing relative to the table. This variation in speed may be accomplished through various modifications of the mechanism and I wish it understood that I do not intend to be limited in the particular structure of the mechanism whereby these various changes in speed may be accomplished. The various embodiments of the invention make it obvious that various changes may be made in the structure of the parts whereby I will be able to accomplish the particular variation in speed which is desired in the installation under consideration.

Figures 8, 9:
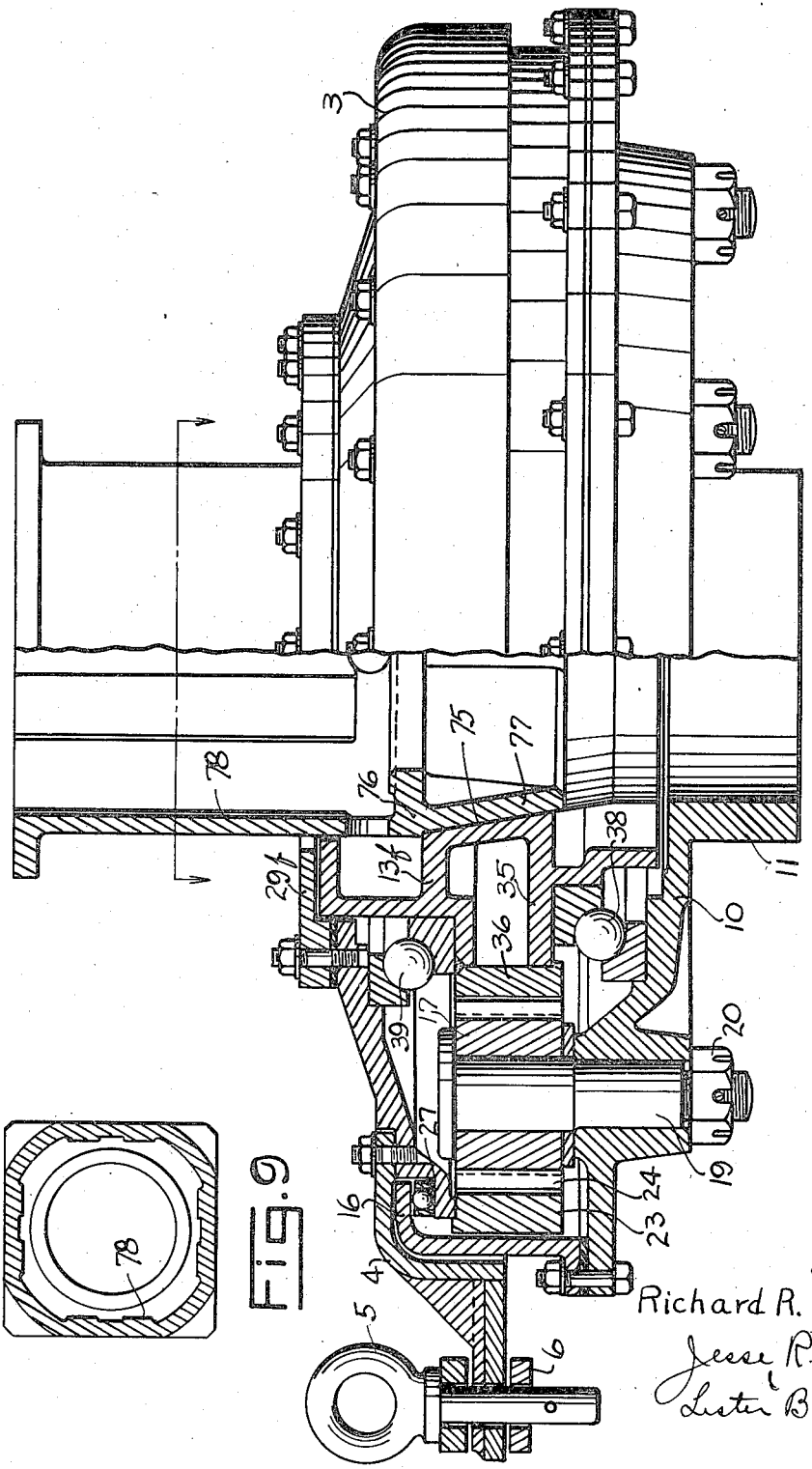
Fig. 8 is a similar side view showing the use of a different drive bushing and slip seat.
Fig. 9 is a transverse section on the plane 9—9 of Fig. 8.

In connection with any of the above described embodiments of the invention, the drive bushing may be of the desired construction. In the form shown in Fig. 1 the drive bushing has therein a cage to grip the drill stem. I contemplate also the provision of a tapered circular seat as shown at 75 in Fig. 8. This seat will accommodate the use of the usual tapered pipe-engaging slips employed to support the pipe in the rotary when the pipe is being handled. When the bushing 13f is constructed in this manner the adaptor 76 has a tapered lower end 77 to fit the tapered seat 75. The adaptor above the tapered end is squared or formed irregularly as shown at 78 in Fig. 9, and thus formed to accommodate the roller cage members 33, 34, shown in Fig. 1. The driving engagement with the kelly will hence be from the bushing 13f to the adaptor 76 and through the roller cage to the drive stem or kelly.

The use of this type of drive bushing makes it possible to support the drill stem by means of slips or otherwise without the use of any additional equipment or changes whatever and will facilitate the handling of the pipe. This feature has obvious advantages which will be recognized by those skilled in the art.

What is claimed as new is:

1. An annular drive plate, means to engage within a rotary table for rotation, a stationary housing associated with said plate forming therewith an annular chamber, a drive bushing centrally of said plate and housing, an outwardly extending support on said bushing in said chamber, a pinion on said support, a ring gear on said plate meshing with said pinion to communicate rotation thereto, and a stationary gear meshing with said pinion on the opposite side thereof.

2. An annular drive plate, means to engage within a rotary table for rotation, a stationary housing associated with said plate forming therewith an annular chamber, a drive bushing centrally of said plate and housing, an outwardly extending support on said bushing in said chamber, a pinion on said support, a ring gear on said plate meshing with the outer face of said pinion to communicate rotation thereto, and a stationary gear meshing with said pinion on the opposite side thereof.

3. An annular drive plate, means to engage within a rotary table for rotation, a stationary housing associated with said plate forming therewith an annular chamber, a drive bushing centrally of said plate and housing, an outwardly extending support on said bushing in said chamber, a pinion on said support rotatable on an upwardly extending post thereon, a stationary gear engaging with the inner side of said pinion, and an internal ring gear mounted on the outer rim of said drive plate and facing inwardly to engage said pinion.

4. An annular drive plate, means to engage within a rotary table for rotation, a stationary housing associated with said plate forming therewith an annular chamber, a drive bushing centrally of said plate and housing, an outwardly extending support on said bushing in said chamber, a pinion on said support, and means on said drive plate engaging said pinion to communicate rotative movement to said bushing at a rate slower than that of said plate.

5. A drill stem drive plate, means thereon to engage nonrotatably with a rotary table, a drive bushing rotatable on said plate, a laterally extending support on said bushing, an internal ring gear on said support, a ring gear on said drive plate, and a pinion mounted on a stationary support and operatively engaging said ring gears whereby said bushing is rotated at a speed slower than that of said plate.

6. A drill stem drive plate, means to engage nonrotatably with a rotary table, a drive bushing rotatable on said plate, a laterally extending support on said bushing, an internal ring gear on said support, a ring gear on said drive plate, an annular plate outside said drive plate, means to hold said annular plate against rotation, and a pinion mounted on said annular plate and positioned to engage said ring gears.

7. A drive plate, means to engage said plate with a rotary for rotation, a drive bushing, a protector plate spaced above said drive plate, overlapping means on said plates to enclose a chamber, a pinion mounted for rotation on said bushing within said chamber, means on said drive plate to engage said pinion and communicate rotation to said bushing, a guard ring on said protector plate engaging over the upper end of said bushing, and seal rings between said bushing and each of said plates whereby lubricant may be retained in said chamber about said gear.

8. A drive plate, means thereon to nonrotatably engage with a rotary table, a drive bushing rotatably mounted on said plate, a laterally projecting support on said drive bushing, a protector plate above said drive plate an internal ring gear on said support, a pinion on said drive bushing and adapted to mesh with said internal gear, and a stationary ring gear meshing with the inner side of said pinion whereby rotation will be communicated to said drive bushing from said drive plate.

RICHARD R. BLOSS.